United States Patent
Ladkat et al.

(10) Patent No.: US 9,891,011 B2
(45) Date of Patent: Feb. 13, 2018

(54) POST TREAT REACTOR INLET TEMPERATURE CONTROL PROCESS AND TEMPERATURE CONTROL DEVICE

(71) Applicant: UOP LLC, Des Plaines, IL (US)

(72) Inventors: Kiran Ladkat, Gurgaon (IN); Amit Batwara, Gurgaon (IN)

(73) Assignee: UOP LLC, Des Plaines, IL (US)

( * ) Notice: Subject to any disclaimer, the term of this patent is extended or adjusted under 35 U.S.C. 154(b) by 790 days.

(21) Appl. No.: 14/227,068

(22) Filed: Mar. 27, 2014

(65) Prior Publication Data

US 2015/0276332 A1 Oct. 1, 2015

(51) Int. Cl.
| | | |
|---|---|---|
| F28F 27/00 | (2006.01) | |
| B01J 8/04 | (2006.01) | |
| B01J 8/00 | (2006.01) | |
| C10G 45/72 | (2006.01) | |
| F28D 21/00 | (2006.01) | |

(52) U.S. Cl.
CPC .............. *F28F 27/00* (2013.01); *B01J 8/001* (2013.01); *B01J 8/0457* (2013.01); *B01J 8/0496* (2013.01); *C10G 45/72* (2013.01); *B01J 2208/0053* (2013.01); *B01J 2208/00061* (2013.01); *B01J 2208/00176* (2013.01); *B01J 2219/00198* (2013.01); *B01J 2219/00202* (2013.01); *B01J 2219/00213* (2013.01); *B01J 2219/00231* (2013.01); *C10G 2300/4006* (2013.01); *F28D 2021/0022* (2013.01)

(58) Field of Classification Search
CPC ......... F28F 27/00; C10G 45/75; C10G 65/04; B01J 8/001; B01J 8/0457; B01J 8/0496; G05D 23/19; G05D 23/1902; G05D 23/1919; G05D 23/1927; G05D 23/1928; G05D 23/193; G05D 23/1931; G05D 23/1932; G05D 23/1934

See application file for complete search history.

(56) References Cited

U.S. PATENT DOCUMENTS

| | | | | |
|---|---|---|---|---|
| 3,979,183 A | * | 9/1976 | Scott ...................... | C10G 49/26 196/132 |
| 3,981,793 A | * | 9/1976 | Christie ................. | C10G 47/36 208/108 |

(Continued)

OTHER PUBLICATIONS

Heinrich et al., "Quality FCC products from increasingly dirty feeds," Petroleum Technology Quarterly (1998), Crambeth Allen Publishing, pp. 39, 41, 43, 45-46, 49.

*Primary Examiner* — Prem C Singh
*Assistant Examiner* — Brandi M Doyle

(57) ABSTRACT

In one aspect, a process for controlling a temperature of fluid entering a post treat reactor in a naphtha hydrotreater includes measuring a temperature of hydrotreater reactor effluent and determining a set point based on the measured temperature. The set point is transmitted to a first temperature indicator controller, and the first temperature indicator controller measures a temperature of fluid flowing into a post treat reactor and adjusts a combined feed flow through a bypass of an upstream combined feed exchanger. This reduces an amount of heat exchanged in the combined feed exchanger and thus prevents the fluid temperature of the fluid entering the post treat reactor from falling below the set point.

13 Claims, 1 Drawing Sheet

(56) References Cited

U.S. PATENT DOCUMENTS

| | | | |
|---|---|---|---|
| 4,236,219 A * | 11/1980 | Killebrew, Jr. | ........ B01J 8/001 |
| | | | 208/143 |
| 4,749,469 A * | 6/1988 | Beerbaum | ............ C10G 45/72 |
| | | | 105/35 |
| 5,264,188 A * | 11/1993 | Lew | ...................... C10G 65/04 |
| | | | 208/211 |
| 5,885,440 A | 3/1999 | Hoehn et al. | |
| 6,387,249 B1 | 5/2002 | Cook et al. | |
| 6,514,403 B1 | 2/2003 | Louie et al. | |
| 6,787,025 B2 | 9/2004 | Mukherjee et al. | |
| 7,244,352 B2 | 7/2007 | Halbert et al. | |
| 7,431,828 B2 | 10/2008 | Hunter et al. | |
| 7,507,328 B2 | 3/2009 | Ellis et al. | |
| 7,875,167 B2 | 1/2011 | Brignac et al. | |
| 8,236,172 B2 | 8/2012 | Podrebarac et al. | |
| 2003/0111387 A1 | 6/2003 | Mukherjee et al. | |
| 2004/0026298 A1 * | 2/2004 | Ellis | ...................... B01J 35/10 |
| | | | 208/210 |
| 2012/0273394 A1 | 11/2012 | Banerjee et al. | |
| 2013/0056391 A1 | 3/2013 | Badhe et al. | |

* cited by examiner

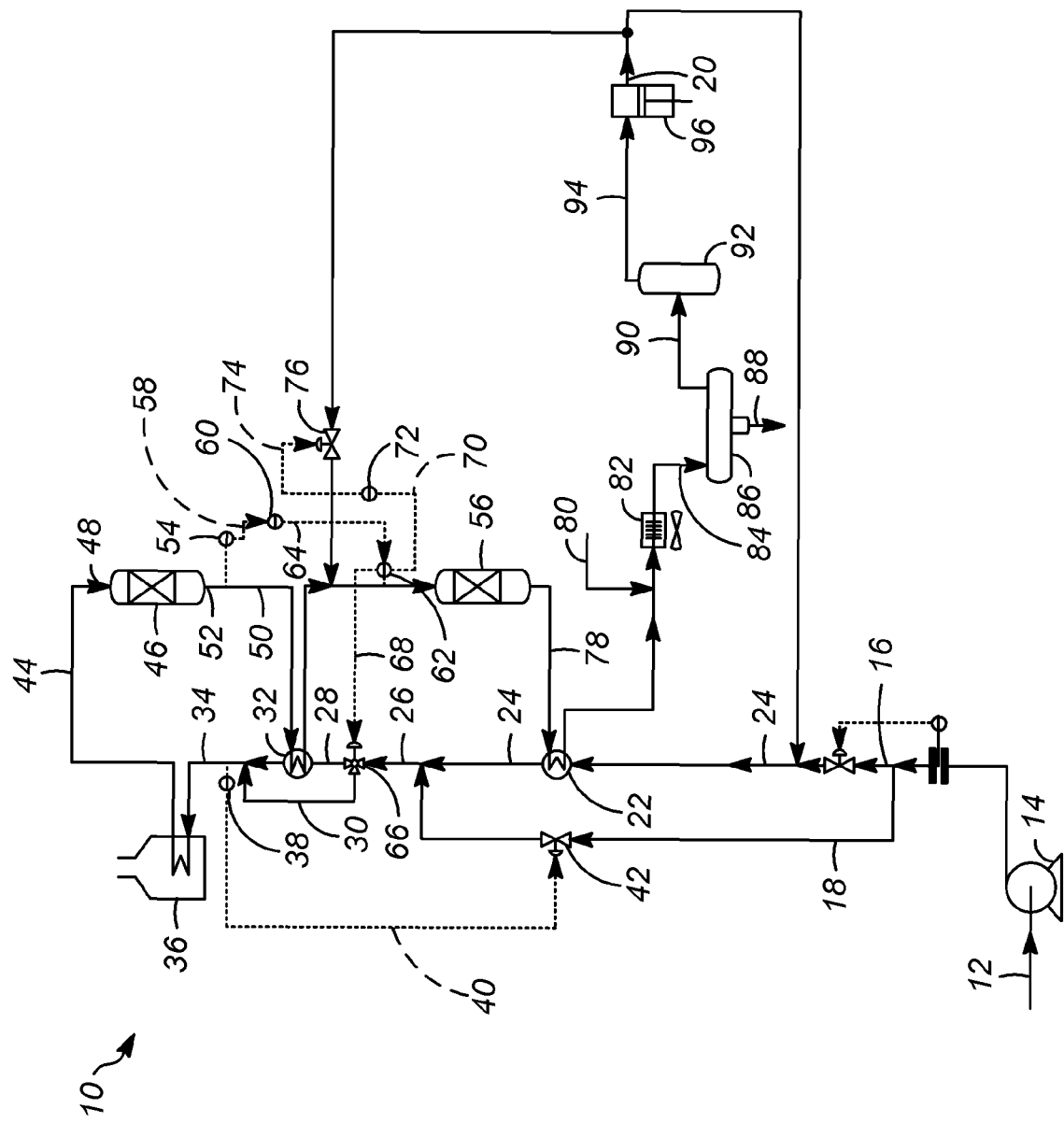

POST TREAT REACTOR INLET TEMPERATURE CONTROL PROCESS AND TEMPERATURE CONTROL DEVICE

BACKGROUND OF THE INVENTION

Naphtha produced from various refinery units, including the Crude and Vacuum Unit, Coker Unit, and others, forms a significant part of the gasoline product pool, and is a major source of the sulfur found in gasoline. This sulfur impurity typically must be removed to comply with various product specifications and/or environmental regulations.

Hydrodesulfurization is a catalytic chemical process used to remove sulfur from a naphtha feed, as well as other petroleum products. Removing the sulfur from these products reduces sulfur dioxide emissions that result from use of the products in fuel combustion. Moreover, removing the sulfur provides benefits within a petroleum refinery because sulfur, even in very small quantities, can adversely affect noble metal catalysts used in downstream processes, such as catalytic reforming.

Conventional fixed bed hydrodesulfurization can reduce the sulfur level of a naphtha feed. During hydrodesulfurization, the raw feed reacts with hydrogen in the presence of a catalyst to convert organic sulfur compounds to hydrogen sulfide. However, the hydrogen sulfide formed during the hydrodesulfurization recombines with olefins in the naphtha feed to form mercaptans, known as recombination mercaptans. In particular, it has been found that presence of recombination mercaptans is increased when the operating temperature of the hydrotreating reactor is high. For instance, temperatures in excess of 650° F. have been found to increase formation of recombination mercaptans.

The hydrodesulfurization process generally involves a hydrogenation reaction, which cleaves a chemical bond between a carbon atom and a sulfur atom in the hydrocarbon. This hydrogenation reaction is exothermic, causing the temperature of effluent leaving the hydrotreater reactor to increase over time. This can cause a corresponding increase in the formation of recombination mercaptans. A post-treat reactor is required to remove the recombination mercaptans by converting mercaptans into hydrogen sulfide.

Accordingly, there is a need to control the temperature of the naphtha feed flowing through the post-treat reactor.

SUMMARY OF THE INVENTION

In one aspect, a process for controlling a temperature of fluid entering a post treat reactor in a naphtha hydrotreater includes measuring a temperature of hydrotreater reactor effluent and determining a set point based on the measured temperature. The set point is transmitted to a first temperature indicator controller, and the first temperature indicator controller measures a temperature of fluid flowing into a post treat reactor and adjusts a combined feed flow through a bypass of an upstream combined feed exchanger. This reduces an amount of heat exchanged in the combined feed exchanger and thus prevents the fluid temperature of the fluid entering the post treat reactor from falling below the set point.

In another aspect, a process for controlling the temperature of fluid entering a post treat reactor in a naphtha hydrotreater includes measuring a temperature of hydrotreater reactor effluent and communicating the measured temperature to a remote set point calculator. The remote set point calculator determines a set point of a first temperature indicator controller based on the measured temperature and transmits the set point from the remote set point calculator to the first temperature indicator controller. The first temperature indicator controller measures a temperature of fluid at a post treat reactor inlet and adjusts a combined feed flow through a bypasss of an upstream combined feed exchanger, reducing the amount of heat exchanged in the combined feed exchanger and preventing the temperature of the fluid entering the post treat reactor from falling below the set point of the first temperature indicator controller. The process further includes transmitting the temperature measured by the first temperature indicator controller to a second temperature indicator controller as a process value. The second temperature indicator controller compares the transmitted temperature process value to a set point specified in the second temperature indicator controller and controls flow of a quench fluid into an inlet of the post treat reactor inlet based on a difference between the transmitted temperature process value and the set point of the second temperature indicator controller so that the fluid temperature at the post treat reactor inlet does not exceed the set point of the second temperature indicator controller.

In yet another aspect, a temperature control device for use with a hydrotreater reactor and a post treat reactor includes a remote set point calculator configured to determine and transmit a set point temperature. The device further includes a temperature indicator in communication with the remote set point calculator. The temperature indicator is configured for measuring a temperature of effluent leaving the hydrotreater reactor and communicating the measured temperature to the remote set point calculator. A first temperature indicator controller is in communication with the remote set point calculator, the first temperature indicator controller measuring a temperature of effluent entering the post treat reactor and comparing the measured temperature of effluent entering the post treat reactor with the set point temperature transmitted by said remote set point calculator. The first temperature indicator controller is configured for controlling a combined feed flow through a bypass of an upstream heat exchanger to prevent fluid temperature of fluid entering the post treat reactor from falling below the set point. The remote set point calculator determines the set point based on the temperature of effluent leaving the hydrotreater reactor measured at said temperature indicator.

BRIEF DESCRIPTION OF THE DRAWING

The FIGURE illustrates one embodiment of a hydrotreating process flow incorporating the post treat reactor inlet temperature control process of the present invention.

DETAILED DESCRIPTION OF THE INVENTION

A process has been developed to control the temperature of fluid entering a post treat reactor in a hydrotreating unit.

Referring now to the FIGURE, a hydrotreating process flow 10 is shown. A hydrocarbon feed 12, such as naphtha, is pumped to a hydrotreating unit through a charge pump 14. After exiting the charge pump 14, the feed 12 is separated into a first portion 16 and a second portion 18. The first portion 16 is mixed with a recycle gas 20 and is passed through a cold combined feed heat exchanger 22, forming a heated feed 24. The second portion 18 bypasses the cold combined feed heat exchanger 22 and rejoins the heated feed 24 to from a combined feed 26.

The combined feed 26 is then split into a first portion 28 and a second portion 30. The first portion 28 of the combined feed 26 passes through a hot combined feed heat exchanger 32. The second portion 30 bypasses the hot combined feed heat exchanger 32 and rejoins the first portion 28 to form a heated combined feed 34. The heated combined feed 34 is then further heated in a charge heater 36. A temperature indicator controller 38 measures a temperature of the heated combined feed 34 at or near an inlet of the charge heater 36 and controls the flow of the second portion 18 bypassing the cold combined feed heat exchanger 22, thus controlling the ratio of the first portion 16 and the second portion 18, based on the measured temperature. To control the flow of the second portion 18 bypassing the cold combined feed heat exchanger 22, an operative connection 40 connects the temperature indicator controller 38 to a cold combined feed bypass control valve 42, such that the valve can be adjusted based on the temperature measured at the temperature indicator controller. The operative connection 40 may be, for example, an electrical, mechanical, or electromechanical connection, a wired data connection, a wireless data connection, or other known means for allowing the temperature indicator controller 38 to adjust the valve 42.

When exiting the charge heater 36, a feed 44 has been heated to a desired reaction temperature. As an example, the feed 44 exiting the charge heater 36 is heated to be in the range of about 550° F. (288° C.) to about 650° F. (343° C.), and preferably approximately 600° F. (315° C.). After exiting the charge heater 36, the feed 44 enters a hydrotreating reactor 46 at an inlet 48. The reactor 46 contains a catalyst for converting contaminants such as sulfur, nitrogen, oxygenates, and halides to hydrogen sulfide, ammonia, water, and hydrogen halides via hydrogenation reactions, as is known in the art. Suitable catalysts may include, for example cobalt-molybdenum or nickel-molybdenum catalysts, as well as other catalysts.

Hydrotreater effluent 50 leaves the hydrotreating reactor 46 through an outlet 52, and the temperature of the effluent is measured using a temperature indicator 54 positioned at or near the reactor outlet. The hydrotreater effluent 50 passes through the hot combined feed exchanger 32 to heat the first portion of the combined feed 28 before it enters the charge heater 36. This path also advantageously cools the effluent 50 before it enters a post-treat reactor 56.

A data connection 58 connects the temperature indicator 54 to a remote set point calculator 60. The data connection 58 includes, for example, wired and/or wireless data connections, electrical connections, or other known means for communicating data, including a temperature measured at the temperature indicator, to the remote set point calculator 60. The temperature measured by the temperature indicator 54 is transmitted to the remote set point calculator 60. The remote set point calculator 60 then determines a set point temperature for the effluent 50 entering the post-treat reactor based on the received temperature data. The remote set point calculator 60 can be, for example, a computer running software to determine the set point, an electrical circuit hardwired to determine a set point, or any combination of hardware and software that can be used to determine the set point.

The set point temperature is determined based on the measured temperature transmitted to the remote set point calculator 60. One example algorithm that may be used is, for example, if the measured temperature is greater than 650° F. (343° C.), then the remote set point calculator 60 determines the set point temperature of effluent entering the post treat reactor to be in the range of about 550° F. (288° C.) to about 600° F. (315° C.), and more preferably 600° F. (315° C.); if the measured temperature is 650° F. or less, the remote set point calculator determines the set point temperature to be 550° F. (288° C.). Those of skill in the art will recognize the set point temperatures determined by the remote set point calculator 60 may be adjusted without departing from the scope of the invention. Likewise, while the example algorithm described above may be used to establish a set point temperature, different algorithms may also be used without departing from the scope of the invention.

The remote set point calculator 60 is connected to a first temperature indicator controller 62 positioned at an inlet of the post treat reactor 56 by a data connection 64. The data connection 64 can be, for example, a wired or wireless data connection, as is known in the art, an electrical connection, or other known connection capable of communicating the determined set point temperature from the remote set point calculator 60 to the first temperature indicator controller 62. The determined set point temperature is communicated to the first temperature indicator controller 62.

When effluent 50 from hydrotreating reactor reaches the first temperature indicator controller 62 after passing though the hot combined feed exchanger 32, the first temperature indicator controller measures the temperature of the reactor effluent at the post treat reactor 56 inlet, and compares the measured temperature to the set point temperature received from the remote set point calculator 60. The first temperature indicator controller 62 is connected to an upstream valve 66 by an operative connection 68, and controls the valve to adjust the flow of the heated combined feed 26 through the hot combined feed heat exchanger 32 so that the temperature of the effluent 50 measured at the first temperature indicator controller does not fall below the set point temperature. More specifically, in some embodiments, the first temperature indicator controller 62 controls the upstream valve 66 so that the temperature of effluent 50 matches the set point temperature. In particular, when the first portion 28 of the hot combined feed 26 passing through the hot combined feed exchanger 32 is relatively large, the effluent 50 from hydrotreating reactor 46 contacts more of the relatively cool feed 28 and is cooled more. Conversely, when the second portion 30 of the feed 26 bypassing the hot combined feed heat exchanger 32 is relatively large, the effluent 50 from hydrotreating reactor 46 is cooled less, allowing the temperature of the effluent to remain higher. The operative connection 68 between the first temperature indicator controller 62 and the upstream valve 66 can be, for example, an electrical, mechanical, or electromechanical connection, a wired or wireless data connection, or other known connection usable to control operation of the valve.

Because the hydrotreating reactions that take place in the hydrotreater reactor 46 are exothermic, the temperature of the effluent 50 gradually increases as the reactor runs. However, the post treat reactor 56 is preferably operated at a temperature range of about 600° F. (315° C.) to about 650° F. (343° C.). The exothermic reaction eventually increases the temperature of the reactor effluent 50 substantially, so that the first temperature indicator controller 62 is no longer capable of maintaining the temperature at the set point using the upstream valve 66.

A data connection 70 connects the first temperature indicator controller 62 to a second temperature indicator controller 72 such that data can be transmitted at least from the first temperature indicator controller to the second temperature indicator controller. The connection 70 can be, for example, a connection capable of wired or wireless data transmission, an electrical connection, or the like. Further, an operative connection 74 connects the second temperature indicator controller 72 to a valve 76 that controls the flow of a quench liquid into the effluent 50 upstream of the first temperature indicator controller 62. The operative connection 74 can be, for example, an electrical, mechanical, or electromechanical connection, a wired or wireless data connection, or other known connection usable to control operation of the valve 76.

The first temperature indicator controller 62 transmits, as a process value, the temperature measured at the inlet to the post treat reactor 56 to the second temperature indicator controller 72 using the data connection 70. The second temperature indicator controller 72 has a set point that approximately matches the maximum temperature of the post treat reactor 56. For example, when the post treat reactor 56 is run at temperatures in the range of 600° F. (315° C.) to 650° F. (343° C.) as discussed above with a maximum temperature of 650° F. (343° C.), the set point of the second temperature indicator controller 72 is preferably similarly set to be within a range of approximately 630° F. (332° C.) to 650° F. (343° C.), and more preferably is set to approximately 650° F. (343° C.). The second temperature indicator controller 72 compares the received temperature process value from the first temperature indicator controller 62 to the set point, and adjusts the valve 76 controlling flow of quench fluid to further adjust the temperature so that it does not exceed the set point of the second temperature indicator controller. Together, the remote set point calculator 60, temperature indicator 54, first temperature indicator controller 62, and second temperature indicator controller 72 form a temperature control device for the post treat reactor 56.

The quench fluid preferably includes a recycle gas 20 from the hydrotreater, though it will be recognized by those of skill in the art that other quench fluids may be used without departing from the scope of the invention.

After passing through the hot combined feed heat exchanger 32, the effluent 50 from the hydrotreating reactor 46 then enters the post treat reactor 56 to treat the recombination mercaptans formed due to recombination reactions in the hydrotreating reactor, as is known in the art. After leaving the post treat reactor 56, post treat reactor effluent 78 flows through the cold combined feed heat exchanger 22 to heat the feed first portion 16 and cool the effluent 78. Then, wash water 80 is injected into the effluent 78, and the effluent is further cooled in a condenser 82 to produce a material 84.

Thereafter, the material 84 enters a product separator 86 to remove sour water 88. The remainder 90 is sent to a stripping column 92, where it is separated into at least a gaseous component 94 and a hydrotreated naphtha component (not shown). The gaseous component 94 enters a compressor 96 to be compressed and added to the naphtha feed as recycle gas. Additionally, the gas 94 may be used as quench fluid in the hydrotreating reactor 46 and/or in the reactor effluent 50. The sour water 88, which contains ammonia, hydrogen chloride, and hydrogen sulfide, is removed from the separator 86 and is further processed as is known in the art. The hydrotreated naphtha is sent downstream for further processing. For example, the naphtha can be sent to a stripping column to remove hydrogen sulfide, water, and light ends. However, the hydrotreated naphtha may undergo different or additional processing without departing from the scope of the invention.

While exemplary embodiments of the process flow have been presented in the foregoing detailed description, it should be appreciated that a vast number of variations exist. It should also be appreciated that the exemplary embodiments merely represent an example, and are not intended to limit the scope, applicability, or configuration of the invention in any way. Rather, the foregoing detailed description will provide those of skill in the art with a convenient road map for implementing an exemplary embodiment of the invention. It will be understood that various changes may be made in the function and arrangement of elements described in an exemplary embodiment without departing from the scope of the invention as set forth in the appended claims.

What is claimed is:

1. A process for controlling a temperature of fluid entering a post treat reactor in a naphtha hydrotreater, comprising:
measuring a temperature of a hydrotreater reactor effluent with a temperature indicator;
determining a set point based on the measured temperature;
transmitting the set point to a first temperature indicator controller, wherein the first temperature indicator controller measures a temperature of fluid flowing into a post treat reactor and adjusts a combined feed flow rate through a bypass of an upstream combined feed heat exchanger, reducing an amount of heat exchanged in the combined feed exchanger and thus preventing the fluid temperature of the fluid entering the post treat reactor from falling below the set point.

2. The process of claim 1, further comprising:
measuring a temperature of the fluid by the first temperature indicator controller, and transmitting the temperature measured to a second temperature indicator controller as a process value;
comparing the transmitted temperature process value to a set point specified in the second temperature indicator controller;
controlling flow of a quench fluid into an inlet of the post treat reactor based on a difference between the transmitted temperature process value and the set point of the second temperature indicator controller so that the temperature at the post treat reactor inlet does not exceed the set point of the second temperature indicator controller.

3. The process of claim 2, wherein the set point of the second temperature indicator controller is in the range of approximately 630° F. to 650° F.

4. The process of claim 2, wherein the set point of the second temperature indicator controller is selected to match a maximum operating temperature of the post treat reactor.

5. The process of claim 2, wherein the quench fluid is the recycle gas from the discharge of an upstream recycle gas compressor.

6. The process of claim 1, wherein the set point of the first temperature indicator controller is in the range of about 500° F. to 600° F. when the measured temperature is less than 650° F., and wherein the set point is approximately 600° F. when the measured temperature is greater than 650° F.

7. The process of claim 1, wherein the measured temperature is transmitted to a remote set point calculator, and the remote set point calculator performs the determining.

8. The process of claim 1, further comprising:
dividing a feed into a first portion and a second portion;
heating the first portion by passing the first portion through another heat exchanger while the second portion bypasses the another heat exchanger;
combining the heated first portion and the second portion to form a combined feed;
measuring a temperature of the combined feed at an inlet of a charge heater, further heating the combined feed by passing the combined feed through the charge heater; and providing the effluent of the charge heater to a hydrotreater reactor, wherein a ratio of the first portion and the second portion is controlled based on the measured temperature of the heated combined fluid.

9. A process for controlling the temperature of a fluid entering a post treat reactor in a naphtha hydrotreater, comprising:

measuring a temperature of a hydrotreater reactor effluent with a temperature indicator and communicating the measured temperature to a remote set point calculator;

determining, using the remote set point calculator, a set point of a first temperature indicator controller based on the measured temperature;

transmitting the set point from the remote set point calculator to the first temperature indicator controller, the first temperature indicator controller measuring a temperature of fluid at a post treat reactor inlet and adjusting a combined feed flow through a bypasss of an upstream combined feed exchanger, reducing the amount of heat exchanged in the combined feed exchanger and preventing the temperature of the fluid entering the post treat reactor from falling below the set point of the first temperature indicator controller;

transmitting the temperature measured by the first temperature indicator controller to a second temperature indicator controller as a process value;

comparing the transmitted temperature process value to a set point specified in the second temperature indicator controller;

controlling, using the second temperature indicator controller, flow of a quench fluid into an inlet of the post treat reactor inlet based on a difference between the transmitted temperature process value and the set point of the second temperature indicator controller so that the fluid temperature at the post treat reactor inlet does not exceed the set point of the second temperature indicator controller.

10. The process of claim 9, wherein the set point of the first temperature indicator controller is in the range of approximately 500° F. to 600° F. when the measured temperature is less than 650° F., and wherein the first set point is approximately 600° F. when the measured temperature is greater than 650° F.

11. The process of claim 9, wherein the set point of the second temperature indicator controller is in the range of approximately 630° F. to 650° F.

12. The process of claim 9, wherein the set point of the second temperature indicator controller is selected to match a maximum operating temperature of the post treat reactor.

13. The process of claim 9, wherein the quench fluid is recycle gas discharged from an upstream recycle gas compressor.

* * * * *